March 3, 1931. E. P. SCHOCH 1,794,552
PROCESS OF RECOVERING SALTS FROM MINERALS
Filed Dec. 29, 1928
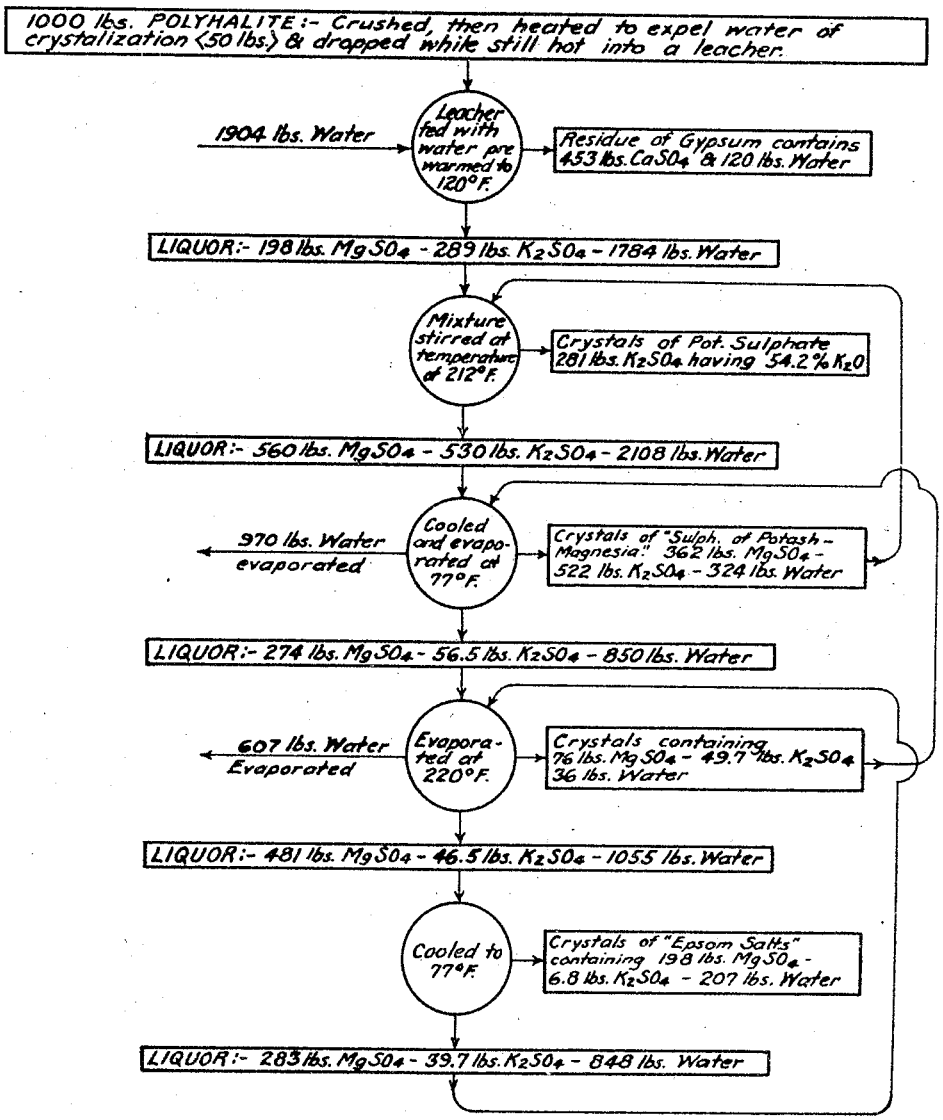

Patented Mar. 3, 1931

1,794,552

UNITED STATES PATENT OFFICE

EUGENE P. SCHOCH, OF AUSTIN, TEXAS

PROCESS OF RECOVERING SALTS FROM MINERALS

Application filed December 29, 1928. Serial No. 329,316.

My invention relates to the extraction of salts from minerals and more particularly has reference to a process of obtaining gypsum, potassium sulphate, and magnesium sulphate in substantially pure form from minerals containing the same.

In my prior application Serial No. 300,959, filed August 20, 1928, I have described and claimed a process of obtaining potassium and magnesium sulphates from polyhalite, krugite, and other ores containing the same, which process consists essentially in first heating the ore to a temperature sufficient to dehydrate the same and then leaching with hot water to dissolve the soluble potassium and magnesium sulphates.

It is an object of my present invention to obtain gypsum, potassium sulphate, and magnesium sulphate, each in substantially pure form, from ores containing the same, the process being carried out in an efficient, practical, and economical manner.

Other objects and advantages will appear from the detailed description of the process, it being understood, however, that various changes and modifications may be made therein without departing from the spirit or scope of the invention as defined in the appended claims.

The process of my present invention is applicable to the treatment generally of minerals or ores containing gypsum, potassium sulphate, and magnesium sulphate. Polyhalite ($2CaSO_4 \cdot K_2SO_4 \cdot MgSO_4 \cdot 2H_2O$), found in west Texas and New Mexico in fairly pure form, is a common type of ore containing gypsum, potassium sulphate, and magnesium sulphate, and I shall therefore describe my process with reference to the treatment of that mineral. However, it is to be expressly understood that my invention is not limited to the treatment of polyhalite as the process may be applied to other ores containing gypsum, potassium sulphate, and magnesium sulphate, for example, krugite.

and others.

Referring now to the treatment of polyhalite in accordance with my invention, the ore having been crushed, admixtures of common salt contained therein may first be removed by leaching with cold water. The ore will now be found to contain practically only the normal ingredients of polyhalite in the molecular proportions as expressed by the formula, $$2CaSO_4 \cdot MgSO_4 \cdot K_2SO_4 \cdot 2H_2O,$$

with the possible exception of a slight excess of calcium sulphate over the amount called for by the formula.

The ore is now calcined or roasted to expel the water of crystallization as in my prior application above referred to and the resulting mass, while still hot, is dropped into water in a leacher, the water being preferably prewarmed sufficiently to be brought to the boiling point by the heat of the calcined ore. As explained in my prior application, the removal of water of crystallization from the ore enables the potassium and magnesium sulphates to be practically entirely removed in a short time by leaching with hot water. The amount of water into which the heated ore is introduced may be such as to immediately form a saturated solution with the potassium and magnesium sulphates extracted, but a larger volume of water is preferably employed since further quantities of potassium and magnesium sulphates are added to the extract at subsequent stages in the process as will be hereinafter described. The liquor is now separated from the solid residue in a known manner which residue, after removal of excess water, represents the gypsum content of the polyhalite in substantially pure form and is the first final product of the process.

To the liquor while still at elevated temperature (approximately 212° F.) there is now added a quantity of potassium and magnesium sulphates obtained in a subsequent stage in the process to be described and the mixture stirred. The added potassium and magnesium sulphates, preferably schoenite

produce in the liquor a strong solution of potassium sulphate and magnesium sulphate which readily lends itself to crystallization. After the stirring, the hot liquor is allowed to crystallize and separation of a crystal crop of substantially pure potassium sulphate takes place which is removed from the solution and represents the second final product of the process.

To the resulting liquor, that is, the liquor from which the potassium sulphate has been crystallized and removed, there is now added a second quantity of potassium and magnesium sulphates also obtained in a subsequent stage of the process to be described. The mixture is then cooled to ordinary temperatures by spraying in the air and this spraying or evaporation by aeration at ordinary temperatures continued until the mixture has lost a substantial part of its water by evaporation. During this operation, there separates the first crop of mixed crystals of potassium and magnesium sulphates or the schoenite crystals which are added to the liquor above mentioned which is about to undergo crystallization for potassium sulphate as already described. In other words, the mixed crystals of potassium and magnesium sulphates separated during the aeration process constitute the first of the two sulphate additions above described, the first addition being the one just prior to potassium sulphate separation.

The liquor is now drained from the crystals of potassium and magnesium sulphates and heated and evaporated hot to remove a further quantity of water. During this evaporation there separates a second mixed crystal crop of potassium and magnesium sulphates, this crop constituting the quantity of potassium and magnesium sulphates added to the liquor after the step of removing the pure potassium sulphate crystals and prior to the aeration step as above described. In other words, the potassium and magnesium sulphates separated at this point in the process are returned to the liquor as the above second mentioned addition of potassium and magnesium sulphates. This second crop of mixed sulphate crystals contains a higher proportion of magnesium sulphate than potassium sulphate, whereas the first crop of mixed sulphate crystals contains a higher proportion of potassium sulphate.

The liquor is now drained from the crystals and cooled to ordinary temperatures as a result of which cooling there crystallizes a crop of nearly pure magnesium sulphate crystals, the third final product of the process, which is then separated from the remaining liquor. This remaining liquor still contains quantities of potassium and magnesium sulphates and, if desired, may therefore be returned to the last evaporation stage, that is, the stage from which is obtained the second crop of mixed crystals of potassium and magnesium sulphates.

In order to more clearly present my invention, I will now describe a practical embodiment of the process, setting forth specific quantities of materials, temperatures, and other operating conditions. It will be understood, however, that the invention is in no way limited thereto as variations may become necessary or desirable with varying compositions of the ore treated or with the varying of other factors in the prcoess.

1000 pounds of polyhalite, suitably crushed in any known manner and, if desired, leached with cold water to remove common salt, is calcined or roasted at approximately 1000° F. to expel water of crystallization (about 50 pounds) and then, while still hot, dropped into 1904 pounds of water pre-warmed to 120° F. There results from this leaching a solid residue of gypsum containing 453 pounds $CaSO_4$ and 120 pounds water, the separated liquor containing 198 pounds $MgSO_4$, 289 pounds $K_2SO_4$, and 1784 pounds water.

To the hot liquor there is now added the first quantity of mixed sulphate crystals obtained later in the process, this crystal crop comprising 362 pounds $MgSO_4$, 522 pounds $K_2SO_4$, and 324 pounds water. The mixture is stirred at about 212° F. and crystallization allowed to take place whereupon is separated a crystal crop of 281 pounds $K_2SO_4$ containing about 54% $K_2O$. This crystal crop is removed from the liquor, the latter comprising 560 pounds $MgSO_4$, 530 pounds $K_2SO_4$, and 2108 pounds water.

To the last mentioned liquor there is now added the second quantity of mixed potassium sulphate and magnesium sulphate crystals obtained later in the process, this quantity comprising 76 pounds $MgSO_4$, 50 pounds $K_2SO_4$, and 36 pounds of water.

The resulting mixture is now cooled and evaporated at 77° F. by spraying or by aeration until the liquor has lost about 970 pounds water by evaporation and during this operation there is separated the first mixed crop of potassium sulphate and magnesium sulphate crystals which is returned to the system as above explained.

Upon separation of the mixed crystal crop, the liquor is found to contain 274 pounds $MgSO_4$, 56½ pounds $K_2SO_4$, and 850 pounds water. To this is added the liquor obtained farther on—from which a crop of magnesium sulphate crystals has just been obtained—and which liquor is composed of 283 pounds $MgSO_4$, 39.7 pounds $K_2SO_4$, and 848 pounds $H_2O$. The combined liquor contains 557 pounds $MgSO_4$, 96.2 pounds $K_2SO_4$, and 1698 pounds $H_2O$, and this is next heated and evaporated hot, that is, at about 220° F., to remove about 607 pounds water and during this step there is separated the second crystal crop of mixed potassium and magnesium sulphates which is returned to the process as explained above. The resultant liquor is drained from the mixed crystal crop and comprises 481 pounds MgSO$_4$, 46½ pounds K$_2$SO$_4$, and 1055 pounds water. This liquor is now cooled to 77° F. and as a result of the cooling there is obtained substantially pure crystals of Epsom salts containing 198 pounds MgSO$_4$, 7 pounds K$_2$SO$_4$, and 207 pounds water. Upon separation of the substantially pure magnesium sulphate crystals from the liquor, the latter is found to comprise 283 pounds MgSO$_4$, 40 pounds K$_2$SO$_4$, and 848 pounds water. This liquor is returned to the last evaporation stage, that is, the one at about 220° F., to be further evaporated together with the other liquor put in as stated.

From the foregoing it will be seen that I have devised a practical and economical method of obtaining gypsum, potassium sulphate, and magnesium sulphate in substantially pure form from polyhalite and other minerals containing these salts. The accompanying drawing is a diagrammatic sketch readily showing the steps of this process.

Having described my invention, I claim:

1. The process of recovering gypsum, potassium sulphate, and magnesium sulphate from ores containing the same which comprises washing the ore with cold water to remove common salt; heating the ore sufficiently to expel water of crystallization; leaching the ore while still hot with warm water to dissolve the potassium and magnesium sulphates; removing the undissolved gypsum from the resultant liquor; mixing with the liquor a quantity of potassium and magnesium sulphates obtained in a later stage of the process; permitting crystallization of potassium sulphate from the resultant mixture and removing the same from the system; mixing with the resultant liquor a second quantity of potassium and magnesium sulphates obtained in a later stage of the process; aerating the resultant mixture to evaporate water and to cause crystallization of mixed crystals of potassium and magnesium sulphates; separating the resultant mixture of potassium and magnesium sulphates and utilizing the same as the first mentioned quantity of potassium and magnesium sulphates added to the liquor as above stated; heating the resultant liquor and evaporating the same while hot to remove additional water and to cause crystallization of a second mixture of potassium and magnesium sulphates; separating said second mixture and utilizing the same as the second mentioned quantity of potassium and magnesium sulphates added to the liquor as above stated; cooling the remaining liquor to thereby cause crystallization of magnesium sulphate and removing the same from the system; and returning the remaining liquor to the last mentioned evaporation stage.

2. The process of recovering gypsum, potassium sulphate, and magnesium sulphate from ores containing the same which comprises heating the ore sufficiently to expel water of crystallization; leaching the ore while still hot with water to dissolve the potassium and magnesium sulphates; removing the undissolved gypsum from the resultant liquor; mixing with the liquor a quantity of potassium and magnesium sulphates obtained in a later stage of the process; permitting crystallization of potassium sulphate from the resultant mixture and removing the same from the system; mixing with the resultant liquor a second quantity of potassium and magnesium sulphates obtained in a later stage of the process; aerating the resultant mixture to evaporate water and to cause crystallization of mixed crystals of potassium and magnesium sulphates; separating the resultant mixture of potassium and magnesium sulphates and utilizing the same as the first mentioned quantity of potassium and magnesium sulphates added to the liquor as above stated; heating the resultant liquor and evaporating the same while hot to remove additional water and to cause crystallization of a second mixture of potassium and magnesium sulphates; separating said second mixture and utilizing the same as the second mentioned quantity of potassium and magnesium sulphates added to the liquor as above stated; and cooling the remaining liquor to thereby cause crystallization of magnesium sulphate and removing the same from the system.

3. The process of recovering gypsum, potassium sulphate, and magnesium sulphate from ores containing the same which comprises heating the ore sufficiently to expel water of crystallization; leaching the ore while still hot with water to dissolve the potassium and magnesium sulphates; removing the undissolved gypsum from the resultant liquor; mixing with the liquor a quantity of potassium and magnesium sulphates; permitting crystallization of potassium sulphate from the resultant mixture and removing the same from the system; mixing with the resultant liquor a second quantity of potassium and magnesium sulphates; and recovering magnesium sulphate from the mixture.

4. The process of recovering gypsum, potassium sulphate, and magnesium sulphate from ores containing the same which comprises heating the ore sufficiently to dehydrate the same; extracting the potassium and magnesium sulphates with hot water; separating the undissolved gypsum from the resultant solution; crystallizing potassium sulphate out of the solution; separating the potassium sulphate crystals from the liquor; and treating the latter for recovery of magnesium sulphate.

5. The process of recovering gypsum, potassium sulphate, and magnesium sulphate from polyhalite which comprises heating the ore sufficiently to expel water of crystallization; leaching the ore while still hot with warm water to dissolve the potassium and magnesium sulphates; removing the undissolved gypsum from the resultant liquor; mixing with the liquor a quantity of potassium and magnesium sulphates obtained in a later stage of the process; permitting crystallization of potassium sulphate from the resultant mixture and removing the same from the system; mixing with the resultant liquor a second quantity of potassium and magnesium sulphates obtained in a later stage of the process; treating the resultant mixture to cause crystallization of mixed crystals of potassium and magnesium sulphates; separating the resultant mixture of potassium and magnesium sulphates and utilizing the same as the first mentioned quantity of potassium and magnesium sulphates added to the liquor as above stated; treating the resultant liquor to cause crystallization of a second mixture of potassium and magnesium sulphates; separating said second mixture and utilizing the same as the second mentioned quantity of potassium and magnesium sulphates added to the liquor as above stated; and recovering magnesium sulphate from the remaining liquor.

6. The process of recovering gypsum, potassium sulphate, and magnesium sulphate from polyhalite which comprises heating the ore sufficiently to dehydrate the same; extracting the potassium and magnesium sulphates by treatment with hot water; removing the undissolved gypsum from the resultant liquor; mixing with the liquor a crop of mixed crystals of potassium and magnesium sulphates containing a greater proportion of potassium sulphate than magnesium sulphate; permitting crystallization of potassium sulphate from the resultant mixture and removing the same from the system; mixing with the resultant liquor a second crop of mixed crystals of potassium and magnesium sulphates containing a greater proportion of magnesium sulphate than potassium sulphate; and recovering magnesium sulphate from the mixture.

7. The process of recovering gypsum, potassium sulphate, and magnesium sulphate from polyhalite and like ores which comprises dehydrating the ore; treating the dehydrated ore with hot water to extract potassium and magnesium sulphates; separating the undissolved gypsum from the liquor; adding to the liquor crystals of potassium sulphate to accelerate crystallization in the liquor; permitting potassium sulphate to crystallize out of the liquor; removing the resultant potassium sulphate crystals; and recovering magnesium sulphate from the remaining liquor.

8. In a method for recovering gypsum, potassium sulphate, and magnesium sulphate from ores containing the same; the steps which comprise extracting the potassium and magnesium sulphates from the ore by leaching with hot water; separating the resultant liquor from the undissolved gypsum; mixing with the liquor a quantity of potassium and magnesium sulphates; permitting crystallization of potassium sulphate from the resultant mixture and removing the same from the system; mixing with the resultant liquor a second quantity of potassium and magnesium sulphates; and recovering magnesium sulphate from the mixture.

9. In a method for recovering gypsum, potassium sulphate, and magnesium sulphate from ores containing the same; the steps which comprise extracting the potassium and magnesium sulphates from the ore by leaching with hot water; separating the resultant liquor from the undissolved gypsum; mixing with the liquor a quantity of potassium and magnesium sulphates; permitting crystallization of potassium sulphate from the resultant mixture and removing the same from the system; and treating the remaining liquor for crystallization of magnesium sulphate.

In testimony whereof I affix my signature.
EUGENE P. SCHOCH.